United States Patent
Zhou et al.

(10) Patent No.: US 10,971,048 B2
(45) Date of Patent: Apr. 6, 2021

(54) SIGNAL TRANSMISSION METHOD, TRANSMITTING UNIT, RECEIVING UNIT AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Chengqi Zhou, Beijing (CN); Xin Duan, Beijing (CN); Hao Zhu, Beijing (CN); Jieqiong Wang, Beijing (CN); Ming Chen, Beijing (CN); Shou Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/618,524

(22) PCT Filed: Jun. 4, 2018

(86) PCT No.: PCT/CN2018/089740
§ 371 (c)(1),
(2) Date: Dec. 2, 2019

(87) PCT Pub. No.: WO2018/223913
PCT Pub. Date: Dec. 13, 2018

(65) Prior Publication Data
US 2020/0135080 A1    Apr. 30, 2020

(30) Foreign Application Priority Data
Jun. 9, 2017   (CN) .......... 201710434370.X

(51) Int. Cl.
*G09G 3/20*        (2006.01)

(52) U.S. Cl.
CPC ....... *G09G 3/20* (2013.01); *G09G 2310/0275* (2013.01); *G09G 2310/08* (2013.01); *G09G 2330/06* (2013.01)

(58) Field of Classification Search
CPC .. G09G 3/20; G09G 2330/06; G09G 2310/08; G09G 2310/0275
See application file for complete search history.

(56) References Cited

U.S. PATENT DOCUMENTS 9,846,656  B2    12/2017   Cooke
2005/0280622  A1    12/2005   Lee et al.
(Continued)

FOREIGN PATENT DOCUMENTS

CN    1702731 A    11/2005
CN    102930808 A    2/2013
(Continued)

OTHER PUBLICATIONS

Office Action received for Chinese Patent Application No. 201710434370.X, dated Nov. 3, 2020, 21 pages (11 pages of English Translation and 10 pages of Office Action).
(Continued)

*Primary Examiner* — Kent W Chang
*Assistant Examiner* — Chayce R Bibbee
(74) *Attorney, Agent, or Firm* — Womble Bond Dickinson (US) LLP

(57) ABSTRACT

The present disclosure relates to a method and device for transmitting a signal in a display device. The display device comprises a timing controller and a source driver. The method is applied to any of a plurality of transmitting units of the timing controller. The plurality of transmitting units correspond to a plurality of receiving units of the source driver in a one-to-one relationship. The method comprises: obtaining a scrambled signal by scrambling, via a scrambler
(Continued)

of the transmitting unit, a non-identification signal in a signal to be transmitted, the scrambled signal comprising an identification signal and a scrambled non-identification signal; and transmitting the scrambled signal to a corresponding receiving unit. A signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$. The present disclosure reduces distortion of an image displayed on a display panel.

20 Claims, 6 Drawing Sheets

(56) References Cited

U.S. PATENT DOCUMENTS

| 2006/0093147 | A1 | 5/2006 | Kwon et al. | |
|---|---|---|---|---|
| 2012/0146965 | A1* | 6/2012 | Baek | G09G 3/006 |
| | | | | 345/204 |
| 2014/0192097 | A1 | 7/2014 | Baek et al. | |
| 2014/0269954 | A1 | 9/2014 | Whitby-Strevens | |
| 2016/0292426 | A1 | 10/2016 | Gibart et al. | |

FOREIGN PATENT DOCUMENTS

| CN | 106021163 A | 10/2016 |
|---|---|---|
| KR | 10-1619049 B1 | 5/2016 |

OTHER PUBLICATIONS

Panda et al., "FPGA Implementation of 8, 16 and 32 Bit LFSR with Maximum Length Feedback Polynomial Using VHDL", 2012 International Conference on Communication Systems and Network Technologies, IEEE, May 11, 2012, pp. 769-773.

Supplementary European Search Report and Search Opinion received for EP Patent Application No. 18812852.4, dated Dec. 23, 2020, 10 pages.

* cited by examiner

SIGNAL TRANSMISSION METHOD, TRANSMITTING UNIT, RECEIVING UNIT AND DISPLAY DEVICE

RELATED APPLICATIONS

The present application is the U.S. national phase entry of PCT/CN2018/089740, with an international filling date of Jun. 4, 2018, which claims the benefit to Chinese Patent Application No. 201710434370.X, filed on Jun. 9, 2017, the entire disclosures of which are incorporated herein by reference.

FIELD

The present disclosure relates to a signal transmission method, and a transmitting unit, receiving unit and display device related thereto.

BACKGROUND

A display device generally may comprise a display panel and a panel drive circuit for driving the display panel. The panel drive circuit may comprise a timing controller, a gate drive circuit and a source drive circuit.

In the prior art, a timing controller comprises a plurality of transmitting units, and a source drive circuit comprises a plurality of receiving units. The plurality of transmitting units correspond to the plurality of receiving units in a one-to-one relationship, and the plurality of receiving units are connected with a plurality of columns of pixel units of a display panel in a one-to-one relationship. When it is required to control the display panel to display an image, each transmitting unit of the timing controller may transmit a data signal to a corresponding receiving unit, so that each receiving unit inputs display signals into the plurality of connected columns of pixel units on the display panel according to the received data signal. Each column of pixel units on the display panel emits light of corresponding colors according to the inputted display signal to enable the display panel to display an image.

SUMMARY

According to embodiments of the present disclosure, there are provided a signal transmission method, a timing controller, a source driver and a display device.

In a first aspect of the embodiments of the present disclosure, there is provided a method for transmitting a signal in a display device. The display device comprises a timing controller and a source driver. The method is applied to any of a plurality of transmitting units of the timing controller. The plurality of transmitting units correspond to a plurality of receiving units of the source driver in a one-to-one relationship. The method comprises: obtaining a scrambled signal by scrambling, via a scrambler in a transmitting unit, a non-identification signal in a signal to be transmitted, the scrambled signal comprising an identification signal and a scrambled non-identification signal; and transmitting the scrambled signal to a corresponding receiving unit. In the method, a signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$.

In some embodiments, the signal to be transmitted comprises: a plurality of signal segments arranged sequentially in time domain and at least one first identification signal between any two adjacent signal segments. The first identification signal is used to instruct the scrambler to perform a reset operation. The scrambling comprises: scrambling non-identification signals in respective signal segments sequentially by a scrambler to obtain the scrambled signal. The scrambled signal comprises: a plurality of scrambled signal segments arranged sequentially in time domain and the at least one first identification signal between any two adjacent scrambled signal segments.

In some embodiments, in signals to be transmitted by any two of the transmitting units, positions of the first identification signals are different in time domain.

In some embodiments, the plurality of transmitting units are connected with a plurality of columns of pixel units on a display panel in a one-to-one relationship through respective receiving units. The scrambling comprises: differently scrambling the signals to be transmitted via scramblers in two transmitting units connected with any two adjacent columns of pixel units.

In some embodiments, the signal to be transmitted comprises: a multi-frame signal spanning images of multiple frames. A single-frame signal included in the multi-frame signal comprises a plurality of row signals. Each row signal comprises a start identification signal and an end identification signal as the identification signal, and a control package signal and a video data package signal as the non-identification signal. The start identification signal is used to indicate the start position of the row signal. The end identification signal is used to indicate the end position of the row signal. At least one of the end identification signals is used as the first identification signal.

In some embodiments, each identification signal in each row signal comprises at least eleven consecutive bits.

In some embodiments, each identification signal comprises four consecutive bit units, and the number of bits of each of the bit units is ten.

In some embodiments, each bit unit has at least two bits with different values.

In some embodiments, each identification signal has six consecutive bits with the same value.

In a second aspect of the embodiments of the present disclosure, there is provided a method for transmitting a signal in a display device. The display device comprises a timing controller and a source driver. The method is applied to any one of a plurality of receiving units of the source driver. The plurality of receiving units corresponds to a plurality of transmitting units of the timing controller in a one-to-one relationship. The method comprises: receiving a scrambled signal from a transmitting unit, the scrambled signal being obtained by scrambling, via a scrambler in the transmitting unit, a non-identification signal in a signal to be transmitted, the scrambled signal comprising an identification signal and a scrambled non-identification signal; and descrambling the scrambled signal by a descrambler in a receiving unit to obtain a descrambled signal. In the method, a signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$. The descrambling of a signal by the descrambler is an inverse process of scrambling of a signal by the scrambler.

In some embodiments, the received signal comprises: a plurality of scrambled signal segments arranged sequentially in time domain and at least one first identification signal between any two adjacent signal segments. The first identification signal is used to instruct the descrambler to perform a reset operation. The descrambling comprises: descrambling non-identification signals in respective scrambled signal segments sequentially by the descrambler to obtain descrambled signal segments. The descrambled signal comprises: a plurality of descrambled signal segments arranged sequentially in time domain and at least one first identification signal between any two adjacent descrambled signal segments.

In some embodiments, in signals received by any two receiving units, positions of the first identification signals are different in time domain.

In some embodiments, the plurality of receiving units are connected with a plurality of columns of pixel units in a display panel of the display device in a one-to-one relationship.

The descrambling comprises: differently descrambling received signals by descramblers in two receiving units connected with any two adjacent columns of pixel units.

In some embodiments, a received signal comprises: a multi-frame signal spanning images of multiple frames. A single-frame signal included in the multi-frame signal comprises a plurality of row signals. Each row signal comprises a start identification signal and an end identification signal as the identification signal, and a control package signal and a video data package signal as the non-identification signal. The start identification signal is used to indicate the start position of the row signal. The end identification signal is used to indicate the end position of the row signal. At least one of the end identification signals is used as the first identification signal.

In some embodiments, each identification signal in each row signal comprises at least eleven consecutive bits.

In some embodiments, each identification signal comprises four consecutive bit units, and the number of bits of each of the bit units is ten.

In some embodiments, each bit unit has at least two bits with different values.

In some embodiments, each identification signal has six consecutive bits with the same value.

In the third aspect of the embodiment of the present disclosure, there is provided a transmitting unit. The transmitting unit is any one of a plurality of transmitting units of a timing controller of a display device. The plurality of transmitting units correspond to a plurality of receiving units of a source driver of the display device in a one-to-one relationship. Each of the transmitting units comprises: a scrambler configured to scramble a non-identification signal in a signal to be transmitted in order to obtain a scrambled signal, the scrambled signal comprising an identification signal and a scrambled non-identification signal; and a transmitter configured to transmit the scrambled signal to a corresponding receiving unit. A signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$.

In some embodiments, the signal to be transmitted comprises: a plurality of signal segments arranged sequentially in time domain and at least one first identification signal between any two adjacent signal segments. The scrambler is configured to perform a reset operation when the first identification signal is detected. The scrambler is further configured to: scramble non-identification signals in respective signal segments sequentially to obtain the scrambled signal. The scrambled signal comprises: a plurality of scrambled signal segments arranged sequentially in time domain and the at least one first identification signal between any two adjacent scrambled signal segments.

In some embodiments, in signals to be transmitted by any two of the transmitting units, positions of the first identification signals are different in time domain.

In some embodiments, the plurality of transmitting units are connected with a plurality of columns of pixel units in a display panel of the display device in a one-to-one relationship by corresponding receiving units. The signals to be transmitted are differently scrambled by scramblers in two transmitting units connected with any two adjacent columns of pixel units.

In some embodiments, the signal to be transmitted comprises: a multi-frame signal spanning images of multiple frames. A single-frame signal included in the multi-frame signal comprises a plurality of row signals. Each row signal comprises a start identification signal and an end identification signal as the identification signal, and a control package signal and a video data package signal as the non-identification signal. The start identification signal is used to indicate the start position of each of the row signals. The end identification signal is used to indicate the end position of each of the row signals. At least one of the end identification signals is used as the first identification signal.

In some embodiments, each identification signal in each row signal comprises at least eleven consecutive bits.

In some embodiments, each identification signal comprises four consecutive bit units, and the number of bits of each of the bit units is ten.

In some embodiments, each bit unit has at least two bits with different values.

In some embodiments, each identification signal has six consecutive bits with the same value.

In a fourth aspect of the embodiment of the present disclosure, there is provided a receiving unit. The receiving unit is any one of a plurality of receiving units of a source driver of a display device. The plurality of receiving units corresponds to a plurality of transmitting units of a timing controller of the display device in a one-to-one relationship. Each of the receiving units comprises: a receiver used to receive a scrambled signal from a corresponding transmitting unit, the scrambled signal being obtained by scrambling a non-identification signal in a signal to be transmitted via a scrambler in a transmitting unit, the scrambled signal comprising an identification signal and a scrambled non-identification signal; and a descrambler used to descramble the scrambled signal to obtain a descrambled signal. A signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$. The descrambling of a signal by the descrambler is an inverse process of the scrambling of the signal by the scrambler.

In some embodiments, a received signal comprises: a plurality of scrambled signal segments arranged sequentially in time domain and at least one first identification signal between any two adjacent signal segments. The descrambler is configured to perform a reset operation when the first identification signal is detected. The descrambler is further configured to: descramble non-identification signals in respective scrambled signal segments sequentially to obtain descrambled signal segments. The descrambled signal comprises: a plurality of descrambled signal segments arranged sequentially in time domain and the at least one first identification signal between any two adjacent descrambled signal segments.

In some embodiments, in signals received by any two receiving units, positions of the first identification signals are different in time domain.

In some embodiments, the plurality of receiving units are connected with a plurality of columns of pixel units of a display panel in a one-to-one relationship. Received signals are differently descrambled by descramblers in two receiving units connected with any two adjacent columns of pixel units.

In some embodiments, a received signal comprises: a multi-frame signal. A single-frame signal in the multi-frame signal comprises a plurality of row signals. Each row signal comprises a start identification signal and an end identification signal as the identification signal, and a control package signal and a video data package signal as the non-identification signal. The start identification signal is used to indicate the start position of each of the row signals. The end identification signal is used to indicate the end position of each of the row signals. At least one of the end identification signals is used as the first identification signal.

In some embodiments, each identification signal in each row signal comprises at least eleven consecutive bits.

In some embodiments, each identification signal comprises four consecutive bit units, and the number of bits of each of the bit units is ten.

In some embodiments, each bit unit has at least two bits with different values.

In some embodiments, ach identification signal has six consecutive bits with the same value.

In a fifth aspect of the embodiment of the present disclosure, there is provided a display device. The display device comprises a timing controller as stated above and a source driver as stated above.

In a sixth aspect of the embodiment of the present disclosure, there is provided a computer readable storage medium storing instructions, which, when executed on a computer, causes the computer performs the method as stated above.

In a seventh aspect of the embodiment of the present disclosure, there is provided a computer program product comprising instructions, which, when executed on a computer, causes the computer to perform the method as stated above.

BRIEF DESCRIPTION OF DRAWINGS

For better understanding of the objects, features and advantages of the present disclosure, the embodiments of the present disclosure will be described with reference to the drawings in an illustrative, not limitative, manner.

DETAILED DESCRIPTION

In order to make clearer the objects, technical solutions and advantages of the present application, the embodiments of the present application will be further described in detail with reference to the drawings. It would be understood that all the drawings are illustrative, and only the parts necessary for explaining the present invention are usually shown, while other parts may be omitted or merely implied.

Since electromagnetic interference occurs between a plurality of data signals when the plurality of transmitting units of the timing controller transmit signals to the plurality of receiving units of the source drive circuit, the data signals received by the receiving units may be distorted, which in turn results in distortion of display signals inputted into the pixel unit by the receiving units. Hence, a respective image displayed on the display panel is also distorted.

Figures 1, 2:
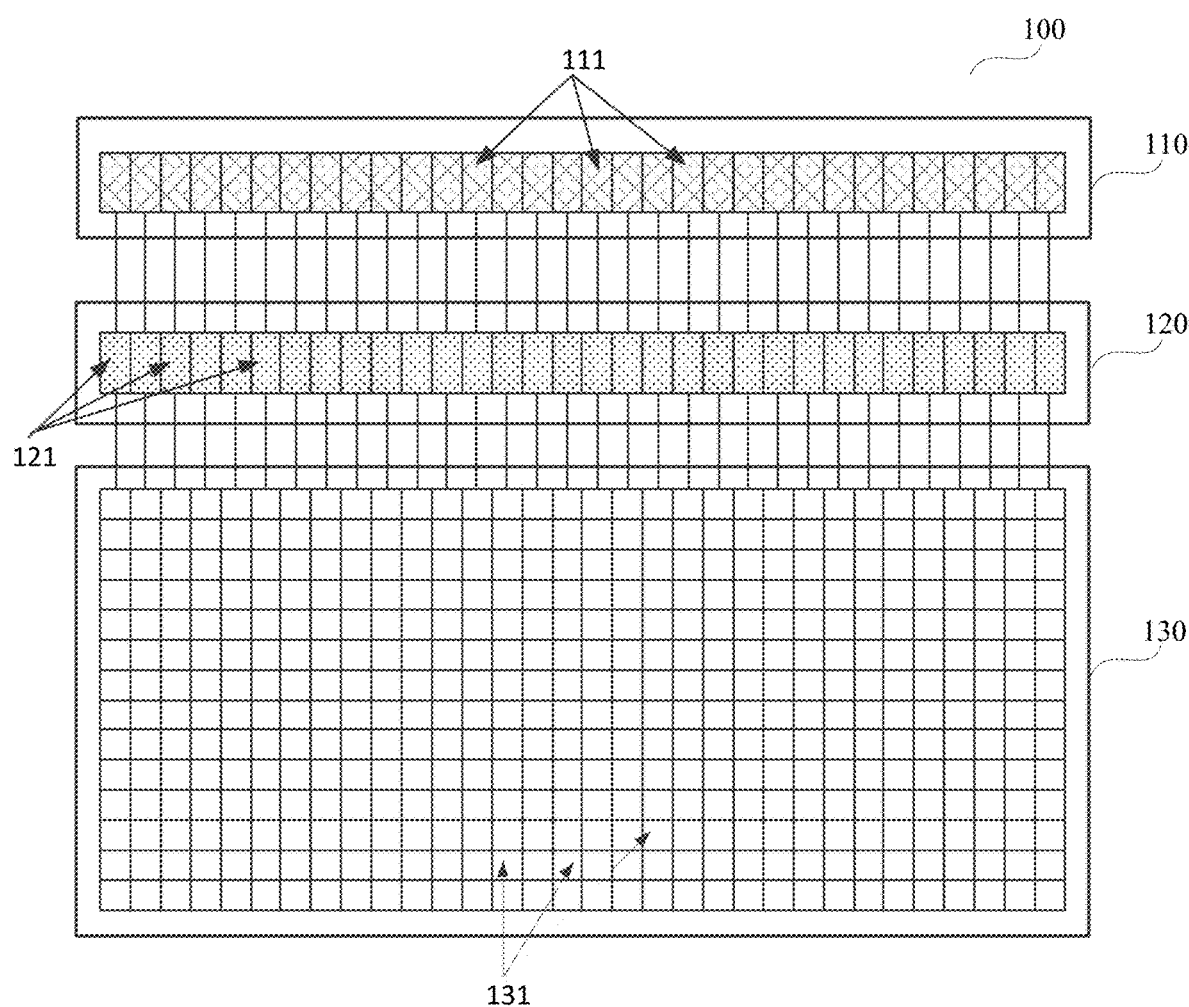
FIG. 1 is a structural schematic view of a display device provided by an embodiment of the present disclosure.
FIG. 2 is a flow chart of a signal transmission method provided by an embodiment of the present disclosure.

FIG. 1 is a structural schematic view of a display device 100 provided by an embodiment of the present disclosure. As shown in FIG. 1, the display device 100 may comprise a timing controller 110 and a source driver 120. The timing controller 110 comprises a plurality of transmitting units 111, and the source driver 120 comprises a plurality of receiving units 121. The plurality of transmitting units 111 of the timing controller 110 are connected with the plurality of receiving units 121 of the source driver 120 in a one-to-one relationship. That is, the plurality of transmitting units 111 and the plurality of receiving units 121 may transmit signals, such as data signals, especially video signals, in a point-to-point transmission mode.

Exemplarily, the display device may be any product or component having a display function, such as a liquid crystal display panel, electronic paper, an organic light-emitting diode (OLED) panel, a mobile phone, a tablet, a TV, a display, a laptop, a digital photo frame and a navigator.

Exemplarily, the timing controller 110 may be provided with a plurality of ports, and each port may be provided therein with at least one lane. That is, the timing controller 110 may be provided with a plurality of lanes, and the plurality of transmitting units 111 of the timing controller 110 are connected with the plurality of lanes in a one-to-one relationship. The source driver 120 may comprise a plurality of source driver chip (not shown in FIG. 1). Each source driver chip is provided with a plurality of ports, and each port may comprise at least one lane. That is, the source driver 120 may be provided with a plurality of lanes, and the plurality of receiving units 121 of the source driver 120 are connected with the plurality of lanes in a one-to-one relationship. Furthermore, the plurality of lanes of the timing controller 110 are further connected with the plurality of lanes of the source driver 120 through signal lines in a one-to-one relationship, so that the plurality of transmitting units of the timing controller 110 are connected with the plurality of receiving units 121 of the source driver 120 in a one-to-one relationship through the ports of the timing controller 110, the signal lines and the ports of the source driver.

With continued reference to FIG. 1, the display device 100 may further comprise a display panel 130. The display panel 130 may be provided with a plurality of pixel units 131 arranged in arrays. Each pixel unit 131 may comprise a thin film transistor and a pixel electrode that are connected to each other. A plurality of pixel units 131 may form a plurality of columns of pixel units which may be connected with the plurality of receiving units 121 of the source driver 120 in a one-to-one relationship. In some embodiments, the display device 100 may also comprise a gate drive circuit (not shown in FIG. 1).

In the conventional technology, since adjacent pixels in the image to be displayed are relatively similar, the input signals for two adjacent columns of pixel units and for displaying the adjacent pixels are also relatively similar. Therefore, the signals transmitted by the transmitting unit to the receiving unit to drive the two adjacent columns of pixel units will be relatively similar. Since the pixel units of the display device are arranged very densely and whereby the corresponding signal lines are also arranged very densely, strong electromagnetic interference between signals will occur when similar signals are simultaneously transmitted via signal lines which are close to each other.

FIG. 2 is a flow chart of a method for signal transmission in a display device provided by an embodiment of the present disclosure. The signal transmission method may be applied to any of the plurality of transmitting units 111 of the timing controller 110 in FIG. 1. The plurality of transmitting units 111 correspond to the plurality of receiving units 121 of the source driver 120 in a one-to-one relationship. It would be understood that the method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. As shown in FIG. 2, the signal transmission method may comprise the following steps.

Step 201: A scrambled signal is obtained by scrambling via a scrambler in the transmitting unit a non-identification signal in a signal to be transmitted. Thus, the scrambled signal comprises an identification signal and a scrambled non-identification signal. In some embodiments, the scrambler may be implemented by a linear feedback shift register. For the sake of brevity, explanation will be made by taking a linear feedback shift register as an example.

In an embodiment, each transmitting unit 111 in FIG. 1 may comprise a first linear feedback shift register which may be configured to scramble a signal. In an embodiment, the signal to be transmitted is a signal that is to be transmitted to the source driver to drive the display panel, and may comprise an identification signal(s) and a non-identification signal(s). A non-identification signal may comprise a data signal used for driving a pixel unit of the display panel to display a corresponding image.

Figure 3:
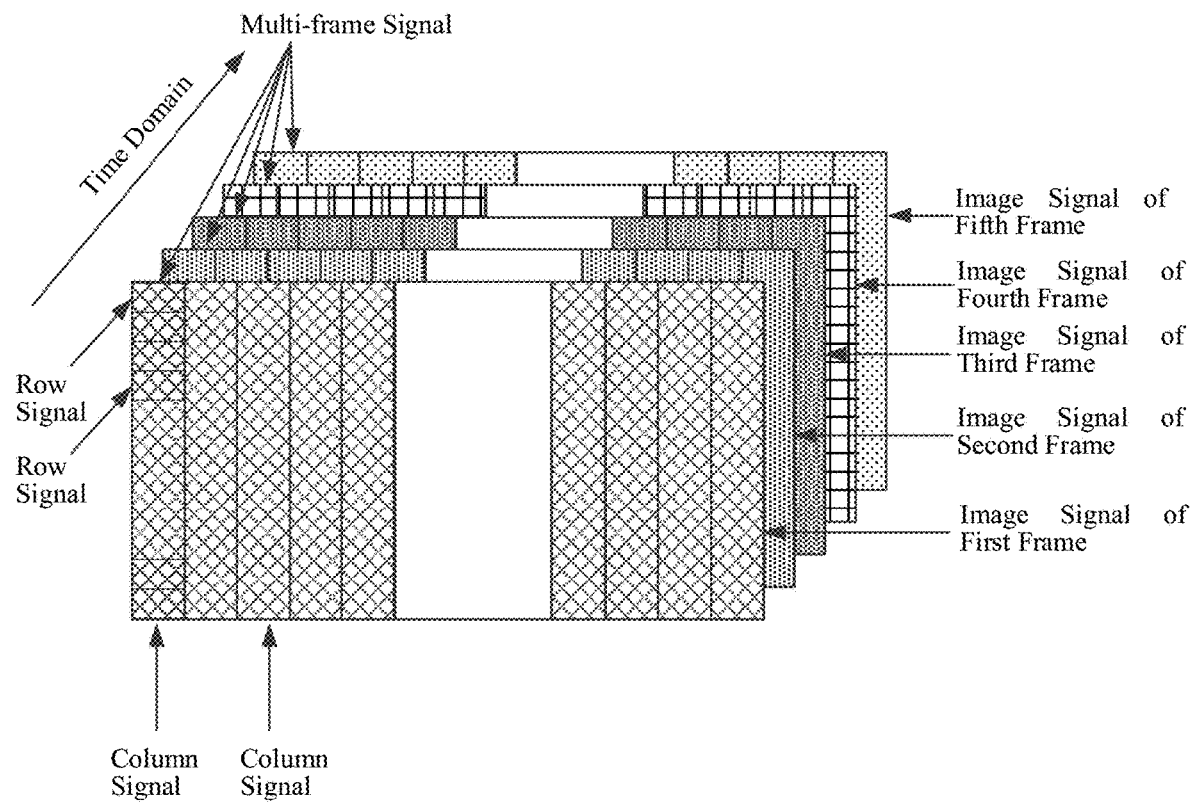
FIG. 3 is a schematic view of a video image signal provided by an embodiment of the present disclosure.

FIG. 3 shows an example of a signal to be transmitted, which may be transmitted by a timing controller to a source driver according to an embodiment of the present disclosure, and the signal to be transmitted may be a video image signal. The video image signal may be stored in the timing controller. The video image signal may comprise image signals of a plurality of consecutive frames in time domain. As an example, FIG. 3 shows image signals of five frames therein. Each image frame may be divided into a plurality of columns, and an image single-frame signal may comprise column signals corresponding to a plurality of transmitting units of the timing controller in a one-to-one relationship (FIG. 3 only shows a number of column signals in the image signal of a first frame). For instance, a column signal S(m, n) corresponds to the n-th column in the m-th image frame. In some embodiments, same columns in image signals of the plurality of frames correspond to the same transmitting unit, and a plurality of column signals consisting of the same columns in each frame are arranged consecutively in time domain. For example, a plurality of column signals corresponding to e.g., the n-th column in each image frame, such as $S(1, n), S(2, n), \ldots S(M, n)$, are arranged consecutively in time domain. When the time controller is required to control the display panel to display a video image, each transmitting unit of the timing controller needs to transmit a plurality of column signals respectively corresponding to the same column in image frames to a receiving unit that corresponds to the transmitting unit, and these column signals are transmitted to corresponding columns of pixel units of the display panel via the receiving unit. Therefore, in an embodiment, a plurality of column signals may be included as a non-identification signal in a signal to be transmitted by a transmitting unit.

The difference between signals may be increased by scrambling the signal to be transmitted, especially the non-identification signal that will affect the display of the pixel unit.

Step 202: the scrambled signal is transmitted to the corresponding receiving unit. The corresponding receiving unit uses a descrambler therein, e.g., a second linear feedback shift register, to descramble the received scrambled signal to obtain a descrambled signal. The descrambled signal corresponds to the signal in the transmitting unit before being scrambled.

Herein, for instance, the characteristic polynomial used by the first linear feedback shift register may comprise $X^{16}+X^5+X^4+X^3+1$, $X^{24}+X^4+X^3+X+1$ or $X^{32}+X^7+X^5+X^3+X^2+X+1$. That is, a signal obtained by scrambling a signal X via the first linear feedback shift register is $X^{16}+X^5+X^4+X^3+1$, $X^{24}+X^4+X^3+X+1$ or $X^{32}+X^7+X^5+X^3+X^2+X+1$. It would be understood that, in order to descramble the scrambled signal correctly, scrambling of a signal via the first linear feedback shift register is an inverse process of descrambling of the signal via the second linear feedback shift register.

It would be understood that in actual implementation, any other suitable multi-order polynomial may also be used as the characteristic polynomial of the first linear feedback shift register. Optionally, a weighted multi-order polynomial may also be used. In some embodiments, when signals to be transmitted by two transmitting units are relatively similar, the first linear feedback shift registers of the two transmitting units may be selected in order to make the difference between the two scrambled signals greater, that is, to reduce the similarity between the signals to be transmitted. By transforming two similar signals to be transmitted into two signals with greater difference, the electromagnetic interference between signals is reduced during a transmission process, and then the signal transmission quality is improved. In the signal transmission method provided by embodiments of the present invention, since each transmitting unit scrambles a non-identification signal in a signal to be transmitted by employing a multi-order polynomial before transmission of the signal, the plurality of scrambled signals transmitted by the plurality of transmitting units are substantially different from each other. When a plurality of signals with substantial difference are transmitted simultaneously, the electromagnetic interference between the signals is at a low level, thereby preventing distortion of the signals received by the receiving units, and then preventing distortion of a respective image displayed on the display panel.

Figure 4:
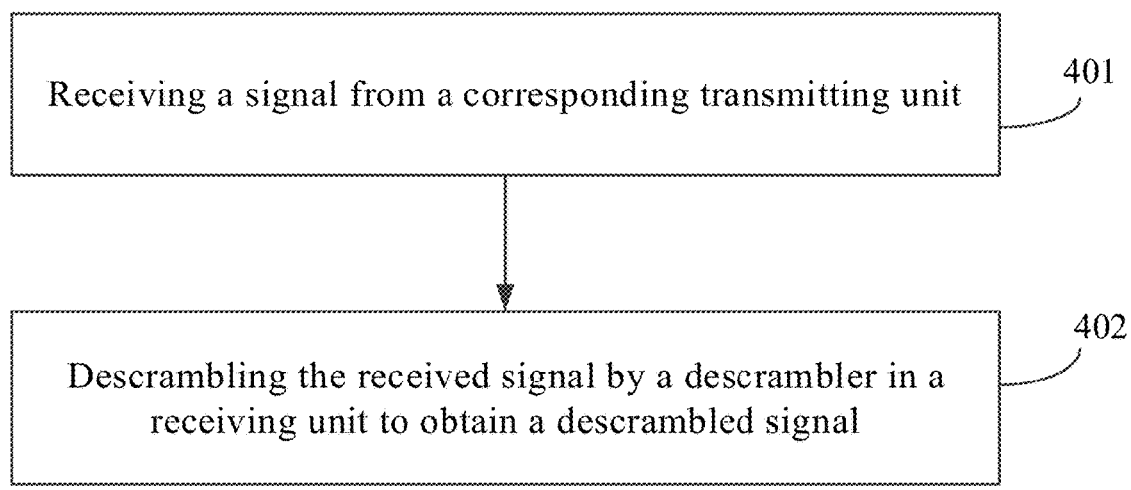
FIG. 4 is a flow chart of another signal transmission method provided by an embodiment of the present disclosure.

FIG. 4 is a flow chart of another method for signal transmission in a display device provided by an embodiment of the present disclosure. The signal transmission method may be applied to any of the plurality of receiving units 121 of the source driver 120 in FIG. 1. The plurality of receiving units 121 correspond to the plurality of transmitting units 111 of the timing controller 110 in a one-to-one relationship. It would be understood that the method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. As shown in FIG. 4, the signal transmission method may comprise the following steps.

Step 401: a scrambled signal from a corresponding transmitting unit is received. The scrambled signal is obtained by scrambling, via a scrambler in the corresponding transmitting unit, e.g., the first linear feedback shift register, a non-identification signal in a signal to be transmitted. The scrambled signal comprises an identification signal and a scrambled non-identification signal.

Step 402: the received signal is descrambled by a descrambler in a receiving unit, e.g., a second linear feedback shift register, to obtain a descrambled signal. The descrambled signal is used to drive the display of the display panel. The descrambling of a signal by the descrambler is an inverse process of the scrambling of the signal via the scrambler.

In an embodiment, the characteristic polynomial used by the second linear feedback shift register that corresponds to the one used by the first linear feedback shift register comprises $X^{16}+X^5+X^4+X^3+1$, $X^{24}+X^4+X^3+X+1$ or $X^{32}+X^7+X^5+X^3+X^2+X+1$.

In an embodiment, the second linear feedback shift register identifies the scrambled non-identification signal in the received signal through an identification signal, and the descrambling of the received signal comprises the descrambling of the scrambled non-identification signal.

In a signal transmission method provided by embodiments of the present invention, since what each receiving unit receives are scrambled signals, the received signals are substantially different from each other. When a plurality of signals with substantial difference are received simultaneously, the electromagnetic interference between the signals with substantial difference is at a low level, thereby preventing distortion of signals received by the receiving units, and further preventing distortion of a respective image displayed on the display panel.

Figure 5:
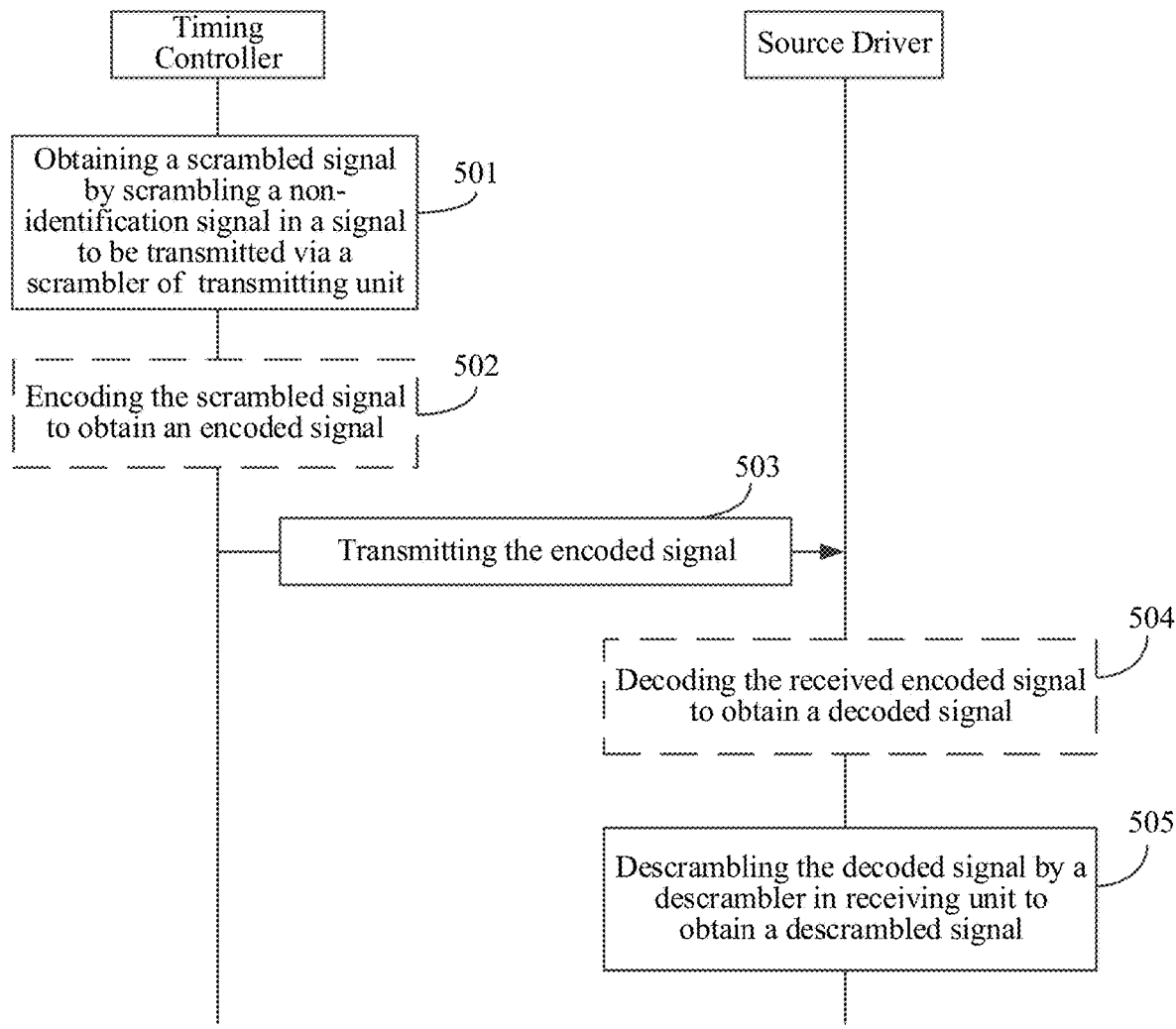
FIG. 5 is a flow chart of a further signal transmission method provided by an embodiment of the present disclosure.

FIG. 5 is a flow chart of a further signal transmission method provided by an embodiment of the present disclosure. It would be understood that the method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. As shown in FIG. 5, the signal transmission method may comprise the following steps.

Step 501: a scrambled signal is obtained by using a scrambler, e.g., the first linear feedback shift register, in a transmitting unit of a timing controller to scramble a non-identification signal in a signal to be transmitted.

In an embodiment, each transmitting unit 111 in FIG. 1 comprises a first linear feedback shift register which may be configured to scramble a signal. In an embodiment, the first linear feedback shift register is configured to perform a reset operation when an identification signal is detected.

Exemplarily, the signal obtained by scrambling a signal X via the first linear feedback shift register comprises, but is not limited to, $X^{16}+X^5+X^4+X^3+1$, $X^{24}+X^4+X^3+X+1$ or $X^{32}+X^7+X^5+X^3+X^2+X+1$. That is, the first linear feedback shift register may scramble a signal with a multi-order characteristic polynomial. In actual application, a scrambled signal may also be obtained by scrambling the signal X via the first linear feedback shift register with other multi-order polynomial containing X. In some embodiments, when signals to be transmitted by two transmitting units are relatively similar, the first linear feedback shift registers are configured to scramble the signals to be transmitted with respective different characteristic polynomials so that similarity between two signals obtained by scrambling is reduced and then difference therebetween is increased. By reducing the similarity between the two signals to be transmitted, the electromagnetic interference between the signals is decreased during transmission.

In some embodiments, a signal to be transmitted by a respective transmitting unit may comprise a multi-frame signal S(n) spanning images of multiple frames, wherein n indicates the n-th column. The multi-frame signal S(n) may be a signal consisting of a plurality of column signals in image signals of multiple frames as shown in FIG. 3, which column signals correspond to one and the same transmitting unit. A single-frame signal in the multi-frame signal refers to a column signal in an image signal of a frame that corresponds to the transmitting unit, which column signal may correspond to a pixel column in an image frame. The single-frame signal may comprise a plurality of row signals. It should be noted that each transmitting unit corresponds to one receiving unit, and individual receiving units correspond to respective columns of pixel units of the display panel. Single-frame signals in signals to be transmitted by a respective transmitting unit are the signals that need to be inputted into the plurality of columns of pixel units of the display panel, and the plurality of row signals in a single-frame signal are the signals that need to be inputted into the plurality of pixel units of the plurality of columns of pixel units (i.e., the pixel units respectively corresponding to each row in the plurality of columns of pixel units).

Figures 6, 7:
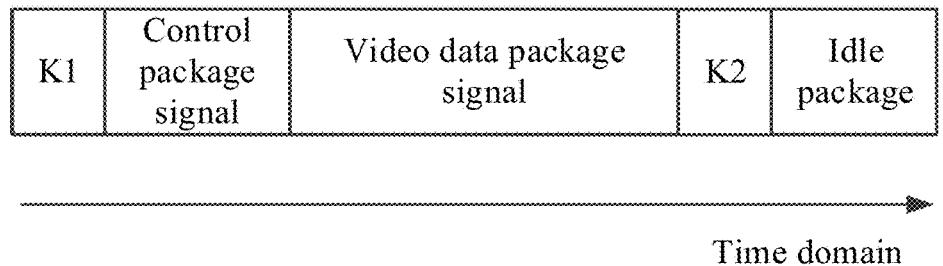
FIG. 6 is a schematic view of a row signal provided by an embodiment of the present disclosure.
FIG. 7 is a schematic view of two frame signals to be transmitted by two transmitting units provided by an embodiment of the present disclosure.

FIG. 6 is a schematic view of a row signal provided by an embodiment of the present disclosure. As shown in FIG. 6, each of the plurality of row signals may comprise a start identification signal K, a control (ctrl) package signal, a video data package signal, an end identification signal K2 and an idle package signal. The start identification signal K1 is used to indicate the start position of each row signal, and the end identification signal K2 is used to indicate the end position of each row signal. The control package signal may also be known as the control-line (ctrl-l) package signal, which comprises control information for functions of the source driver, such as timing or driving current. The control package signals in signals to be transmitted by respective transmitting units are the same. The identification signal in a row signal may comprise: the start identification signal K1 and the end identification signal K2. The non-identification signal in the row signal may comprise: a control package signal, a video data package signal and an idle package signal. In the embodiment of the present invention, when the first linear feedback shift register is utilized by the transmitting unit to scramble a signal to be transmitted, it only scrambles the non-identification signal in the signal to be transmitted, such as the control package signal and the video data package signal, without scrambling the identification signal in the signal to be transmitted. Therefore, the scrambled signal obtained through scrambling by the first linear feedback shift register may comprise an unscrambled identification signal and a scrambled non-identification signal.

FIG. 7 is a schematic view of two frame signals to be transmitted by two transmitting units provided by an embodiment of the present disclosure. As shown in FIG. 7, the two transmitting units are respectively a transmitting unit A and a transmitting unit B. A single-frame signal to be transmitted by a respective transmitting unit comprises a plurality of row signals and then a plurality of end identification signals K2 corresponding to respective row signals. In an embodiment, in the plurality of end identification signals K2, there is at least one special end identification signal K3. Unlike the end identification signal K2 which is only used to indicate the end position of the row signal, the special end identification signal K3 may be used not only to indicate the end position of the row signal, but also to instruct the scrambler to perform a reset operation so as to start scrambling of a next input signal. In an embodiment, the signal to be transmitted by a transmitting unit may be divided into a plurality of signal segments, each of which is considered as an input signal to be scrambled. Each signal segment may comprise one or more row signals, or signals of one or more frames. Therefore, before being scrambled, the signal to be transmitted by a transmitting unit may comprise a plurality of signal segments and at least one special end identification signal, i.e., a first identification signal. The plurality of signal segments are arranged sequentially in time domain, and there is a first identification signal between any two adjacent signal segments.

In some embodiments, the single-frame signal shown in FIG. 7 comprises a plurality of row signals consecutively in time domain, and the single-frame signal may also comprise a frame end identification signal K4 following the plurality of row signals for indicating the end of a signal of a frame.

Returning to FIG. 5, when performing Step 501, the transmitting unit may use the scrambler therein to sequentially scramble the non-identification signal in each of the signal segments in the signal to be transmitted so as to obtain the scrambled signal. The scrambled signal comprises: a plurality of scrambled signal segments and at least one first identification signal. The plurality of scrambled signal segments is sequentially arranged in time domain, and there exists a first identification signal between any two adjacent signal segments. That is, in the process that the transmitting unit uses the first linear feedback shift register to scramble the signal to be transmitted, if a segment end identification signal is currently scanned by the first linear feedback shift register, the first linear feedback shift register stops scrambling the current signal segment and performs a reset operation. After performing the reset operation, a signal segment(s) after the segment end identification signal is scanned and scrambled again. As such, individually scrambling of the plurality of signal segments is achieved.

In an embodiment, on the premise of scrambling a signal segment to be transmitted by a transmitting unit, the embodiment of the present invention may also achieve different scrambling by: arranging first identification signals in different positions in time domain (for example, arranging the first identification signals (e.g., K3) in the signals to be transmitted by any two transmitting units in different positions in a video thread (e.g., in different end positions of row data)) so as to form different signal segments. As shown in FIG. 7, positions of the first identification signals K3 in signals to be transmitted by the transmitting unit A and the transmitting unit B are different in time domain, wherein a first identification signal K3 of the transmitting unit A is arranged in the end position of the first row signal counting from the left in the drawing, whereas a first identification signal K3 of the transmitting unit B is arranged in the end position of the second row signal counting from the left in the drawing. As such, the signal segments of the transmitting units A and B that are obtained through division via the first identification signals K3 are less similar. In another embodiment, it is also possible to arrange the first identification signals in signals to be transmitted by any two transmitting units in different positions in time domain so as to form signal segments of different lengths. For instance, the divided signal segments in the transmitting unit A are longer, whereas the divided signal segments in the transmitting unit B are shorter. This again allows the signal segments of the transmitting units A and B obtained through division via the first identification signals K3 to be less similar. Since the similarity between signals to be scrambled is lowered and then the difference therebetween is increased, the scrambled signals are substantially different, thereby preventing the electromagnetic interference between signals during transmission of the signals.

In some embodiments, the plurality of receiving units are connected with a plurality of columns of pixel units in the display panel in a one-to-one relationship. Correspondingly, the plurality of transmitting units are connected with the plurality of columns of pixel units in the display panel through the plurality of corresponding receiving units. In the embodiment of the present invention, the scramblers, e.g., the first linear feedback shift registers, in two transmitting units connected with any two adjacent columns of pixel units are configured to differently scramble signals to be transmitted. "Differently scramble" may comprise scrambling the signals to be transmitted by the first linear feedback shift registers with different characteristic polynomials. Since different signals will be obtained when identical signals are scrambled by a linear feedback shift register with different characteristic polynomials, the scrambling according to embodiments of the present disclosure reduces the similarity between similar signals inputted into two adjacent columns of pixel units, thereby reducing mutual electromagnetic interference during transmission.

It should be noted that, in an embodiment, since an identification signal in a signal to be transmitted is further configured to indicate the end and start of scrambling, the correct reception of the identification signal is also very important. In the prior art, the number of bits of each identification signal is usually set to be 10. In order to ensure that the identification signal can be effectively received by a receiving unit, the number of bits of each identification signal in embodiments of the present invention may be set to be larger than 10, for example, each identification signal in each row signal may be set to comprise at least eleven consecutive bits. Thus, when the first ten bits of the identification signal are not received during signal receiving, while the bits after the tenth bit are received, the receiving unit may restore the unreceived first ten bits based on the received bits after the tenth bit, thereby determining the identification signal. In another scene, if the receiving unit misjudges the first ten bits, the receiving unit may correct the first ten bits based on the bits after the tenth bit, thereby correctly identifying the identification signal. For instance, a K code defined in a relevant protocol is data of 40 consecutive bits, wherein every 10 bits is treated as a unit, i.e., the data actually transmitted for K1 is K1G1G1K1. During restoration of data after the data is received, when the receiving unit receives such a characteristic code as G1G1K1, it can still restore the data according to the characteristics of the residual 30 bits even if the first ten bits are misread. This improves the fault tolerance of an identification signal. In addition, since the identification signal in embodiments of the present invention has a larger number of bits, more types of identification signals may be obtained from combinations of more bits in embodiments of the present invention, thereby enabling to further identify relevant information in the process of signal transmission.

Exemplarily, each identification signal may comprise four consecutive bit units, and the number of bits of each bit unit is ten. That is, each identification signal in embodiments of the present invention may comprise forty bit units. When a receiving unit does not receive the previous one or more bit units, it may determine the identification signal based on subsequent bit units.

In some embodiments, when an identification signal has at least two bits with different values, the receiving unit may readily identify the identification signal. Thus, in embodiments of the present invention, each bit unit may be provided with at least two bits of different values. Further, each identification signal may be provided therein with six consecutive bits of the same value. Thus, when the receiving unit receives and identifies the identification signal, it may determine whether the identification signal is received by judging whether six consecutive bits of the same value are received.

Exemplarily, Table 1 shows four bit units comprised in an individual identification signal in a signal to be transmitted by a transmitting unit. As shown in Table 1, in embodiments of the present invention, the value of each bit is a binary number, and in order to ensure that each bit unit has at least two bits with different values, two of the four bit units can be set to be mutually exclusive and the other two bit units are mutually exclusive as well. For example, in the four bit units of K, the bit unit (0111111010) and the bit unit (1000000101) are mutually exclusive and the bit unit (1010101000) and bit unit (0101010111) are mutually exclusive.

In some embodiments, K1 may consist of a bit unit (0111111010), a bit unit (1000000101), a bit unit (1010101000) and a bit unit (0101010111) that are arranged sequentially in time domain, or K1 may consist of a bit unit (0111111010), a bit unit (0101010111), a bit unit (1010101000) and a bit unit (1000000101) that are arranged sequentially in time domain. It should be noted that the arrangement sequence of the four bit units shown in Table 1 is exemplary, but not limitative. The four bit units comprised in respective identification signals may be arranged in other suitable sequences different from those shown in Table 1.

TABLE 1

| Identification signal | Four bit units | | | |
| --- | --- | --- | --- | --- |
| K1 | 0111111010 | 1010101000 | 1000000101 | 0101010111 |
| K2 | 0111111011 | 1011100000 | 1000000100 | 0100011111 |
| K3 | 0111111001 | 1001110000 | 1000000110 | 0110001111 |
| K4 | 0111111000 | 1000111000 | 1000000111 | 0111000111 |

Step 502: The transmitting unit encodes the scrambled signal to obtain an encoded signal.

Exemplarily, in order to increase a signal transmission rate by reducing the bit error rate, the transmitting unit may also encode the scrambled signal using 8b/10b encoding method (i.e., encoding 8 bit data into 10 bit data) to get the encoded signal before transmitting the scrambled signal. Optionally, in the process of encoding, all of the identification signals will not be encoded, that is, the signals being encoded are non-identification signals.

Step 503: The transmitting unit transmits the encoded signal to the receiving unit.

After obtaining the encoded signal, the transmitting unit may transmit the encoded signal to a corresponding receiving unit through the path established with the corresponding receiving unit. It should be noted that the plurality of transmitting units may transmit corresponding encoded signals to respective receiving units in parallel.

Step 504: The receiving unit decodes the received encoded signal to obtain the decoded signal. After receiving the encoded signal, the receiving unit may decode the encoded signal by using 8b/10b decoding method (i.e., decoding 10 bit data into 8 bit data) to get the decoded signal. The decoded signal corresponds to the scrambled signal obtained in Step 501.

Step 505: The receiving unit descrambles the decoded signal using a descrambler, such as a second linear feedback shift register, to obtain a descrambled signal, which corresponds to the signal before being scrambled in the transmitting unit.

The receiving unit may use a second linear feedback shift register to descramble the scrambled signal to obtain the signal before being scrambled (i.e., the signal to be transmitted). In doing so, the transmitting unit successfully transmits the signal to be transmitted to the corresponding receiving unit. Exemplarily, the signal scrambling sequence of the first linear feedback shift register may be inverse to the signal descrambling sequence of the second linear feedback shift register.

In an embodiment, since a second linear feedback shift register in a receiving unit descrambles a signal scrambled by a first linear feedback shift register in a transmitting unit corresponding to the receiving unit, when first linear feedback shift registers in two transmitting units are different, second linear feedback shift registers in two corresponding receiving units are different as well. In addition, since scrambled data transmitted by different transmitting units at the same time are different (originating from different linear feedback shift registers), data energy will be more dispersed in terms of an overall energy distribution, thereby having an effect of eliminating energy peak spectrum. Exemplarily, the signal transmission method provided by embodiments of the present invention may result in an attenuation of about 7 dB at the peak spectrum.

It should be noted that the steps of the signal transmission method provided by embodiments of the present invention may also be added or reduced as appropriate. Variations to the method will easily occur to those skilled in the art based on the disclosed technical scope of the present invention, which shall be covered within the protection scope of the present invention.

In summary, in the signal transmission method provided by embodiments of the present invention, since each of transmitting units scrambles the non-identification signal in a signal to be transmitted with a multi-order polynomial before transmitting the signal, the plurality of scrambled signals transmitted by a plurality of transmitting units are substantially different from each other. When signals with substantial difference are transmitted simultaneously, the electromagnetic interference between these signals with substantial differences is at a low level, thereby preventing distortion of signals received by the receiving units, and further preventing distortion of a respective image displayed on the display panel.

Figure 8:
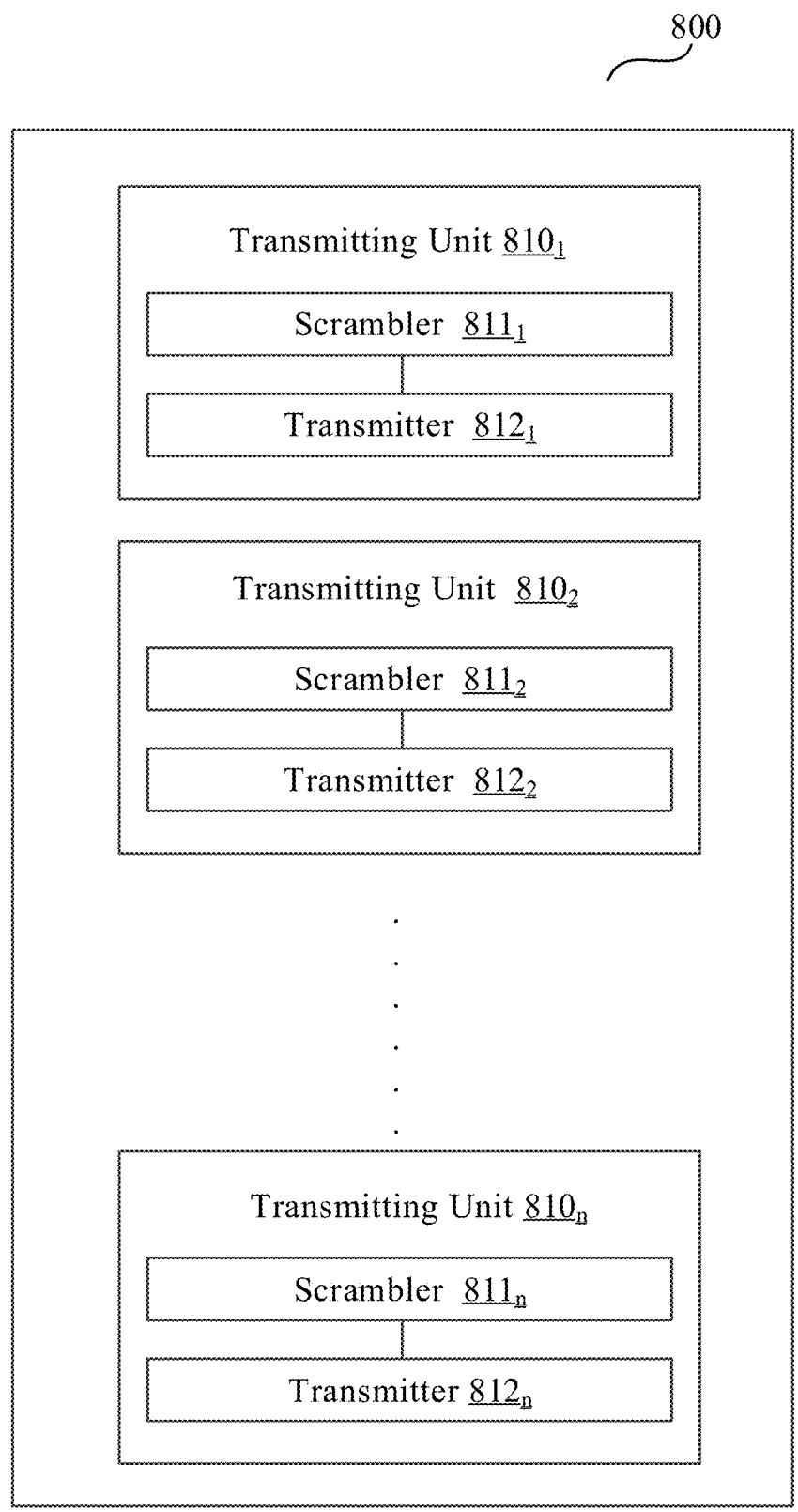
FIG. 8 is a structural schematic view of a transmitting unit provided by an embodiment of the present disclosure.

FIG. 8 is a schematic view of the structure 800 of a transmitting unit provided by an embodiment of the present disclosure. The transmitting unit may be applied in a timing controller. The timing controller may be implemented as a timing controller 110 in FIG. 1, and comprise or use a plurality of transmitting units, wherein three transmitting units $810_1$, $810_2$, ..., $810_n$ are shown as an example in the drawing. As shown in FIG. 8, the transmitting unit $810_1$ may comprise a scrambler $811_1$ and a transmitter $812_1$. Similarly, the transmitting unit $810_2$ may comprise a scrambler $811_2$ and a transmitter $812_2$, and the transmitting unit $810_n$ may comprise a scrambler $811_n$ and a transmitter $812_n$. The scramblers $811_1$, $811_2$, ..., $811_n$ are configured to scramble respective non-identification signals in signals to be transmitted to obtain scrambled signals. A scrambled signal comprises an identification signal and a scrambled non-identification signal. The transmitters $812_1$, $812_2$, ..., $812_n$ are configured to transmit the scrambled signals to corresponding receiving units, so that the corresponding receiving units use descramblers therein to descramble the scrambled signals to obtain the signals before being scrambled.

In an embodiment, the scramblers $811_1$, $811_2$, ..., $811_n$ may be respectively implemented by a first linear feedback shift register. A signal obtained by scrambling a signal X by the first linear feedback shift register may be $X^{16}+X^5+X^4+X^3+1$, $X^{24}+X^4+X^3+X+1$ or $X^{32}+X^7+X^5+X^3+X^2+X+1$. The signal scrambling sequence of the first linear feedback shift register is inverse to the signal descrambling sequence of the second linear feedback shift register.

In some embodiments, a signal to be transmitted comprises: a plurality of signal segments and at least one first identification signal between any two adjacent signal segments. The first identification signal is used to instruct the linear feedback shift register to perform a reset operation, which indicates that a current signal to be scrambled by the linear feedback shift register comes to an end. The signal segments are arranged sequentially in time domain before being scrambled. In an embodiment, the scrambler is also configured to separately scramble each of the signal segments. It may be configured to sequentially scramble non-identification signals in individual unscrambled signal segments. The scrambled signal comprises: a plurality of scrambled signal segments and at least one first identification signal. The plurality of scrambled signal segments are arranged sequentially in time domain and there is a first identification signal between any two adjacent signal segments of the scrambled signal segments.

In some embodiments, in two signals to be transmitted by any two of the transmitting units such as the transmitting units $810_1$ and $810_2$, positions of first identification signals are different in time domain. This may be achieved by dividing the two signals to be transmitted into signal segments of the same length and staggering the start positions of the signal segments in time domain. Alternatively, it may also be achieved by dividing the two signals to be transmitted into signal segments of different lengths and then making the positions of the first identification signals different in time domain. Since the signals to be scrambled by scrambler are different, the difference between the scrambled signals will be further increased, thereby decreasing the electromagnetic interference between signals.

In an embodiment, the plurality of transmitting units are connected with the plurality of columns of pixel units in the display panel in a one-to-one relationship through the plurality of corresponding receiving units. The scramblers in the two transmitting units connected with any two adjacent columns of pixel units may be arranged to be different in order to increase the difference between the scrambled signals. For instance, the transmitting units $810_1$ and $810_2$ as shown in FIG. 8 may correspond to two adjacent columns of pixel units. Thus, the scrambler $811_1$ in the transmitting units $810_1$ and the scrambler $811_2$ in the transmitting units $810_2$ may be different, e.g., by employing different characteristic polynomials. In an example, for the same signal X, a signal $X_1$ obtained by scrambling the signal X via the scrambler $811_1$ may be $X^{16}+X+X^4+X^3+1$, and a signal $X_2$ obtained by scrambling the signal X via the scrambler $811_2$ may be $X^{24}+X^4+X^3+X+1$. $X_1$ is different from $X_2$. Thus, in comparison with simultaneous transmission of two identical signals X, the electromagnetic interference caused by simultaneously transmitting different signals $X_1$ and $X_2$ is substantially reduced. It would be understood that the characteristic polynomials employed by scramblers as provided herein are exemplary, rather than limitative. The scrambler according to the embodiment of the present disclosure may also employ other suitable characteristic polynomials.

In some embodiments, the signal to be transmitted comprises a multi-frame signal. A single-frame signal of the multi-frame signal comprises a plurality of row signals. Each of the plurality of row signals comprises a start identification signal, a control package signal, a video data package signal, an end identification signal and an idle package signal. The start identification signal is used to indicate the start position of each row signal. The end identification signal is used to indicate the end position of each row signal. In an example where a signal is segmented, there is at least one first identification signal among a plurality of end identification signals comprised in a single-frame signal of a multi-frame signal. Each of the first identification signals indicates the end position of a respective signal segment.

In some embodiments, each identification signals in each row signal comprises at least eleven consecutive bits.

In some embodiments, each identification signal comprises four consecutive bit units, and the number of bits of each bit unit is ten.

In some embodiments, each bit unit has at least two bits with different values.

In some embodiments, each identification signal has six consecutive bits with the same value.

In summary, since scramblers, such as first linear feedback shift registers, in transmitting units provided by the embodiments of the present invention scramble non-identification signals in signals to be transmitted with multi-order polynomials before transmission of the signals, the plurality of scrambled signals transmitted by the transmitters in the plurality of transmitting units are substantially different from each other. When a plurality of signals with substantial difference are transmitted simultaneously, the electromagnetic interference between the signals with substantial difference is at a low level, thereby preventing distortion of signals received by the receiving units, and further preventing distortion of a respective image displayed on the display panel.

Figure 9:
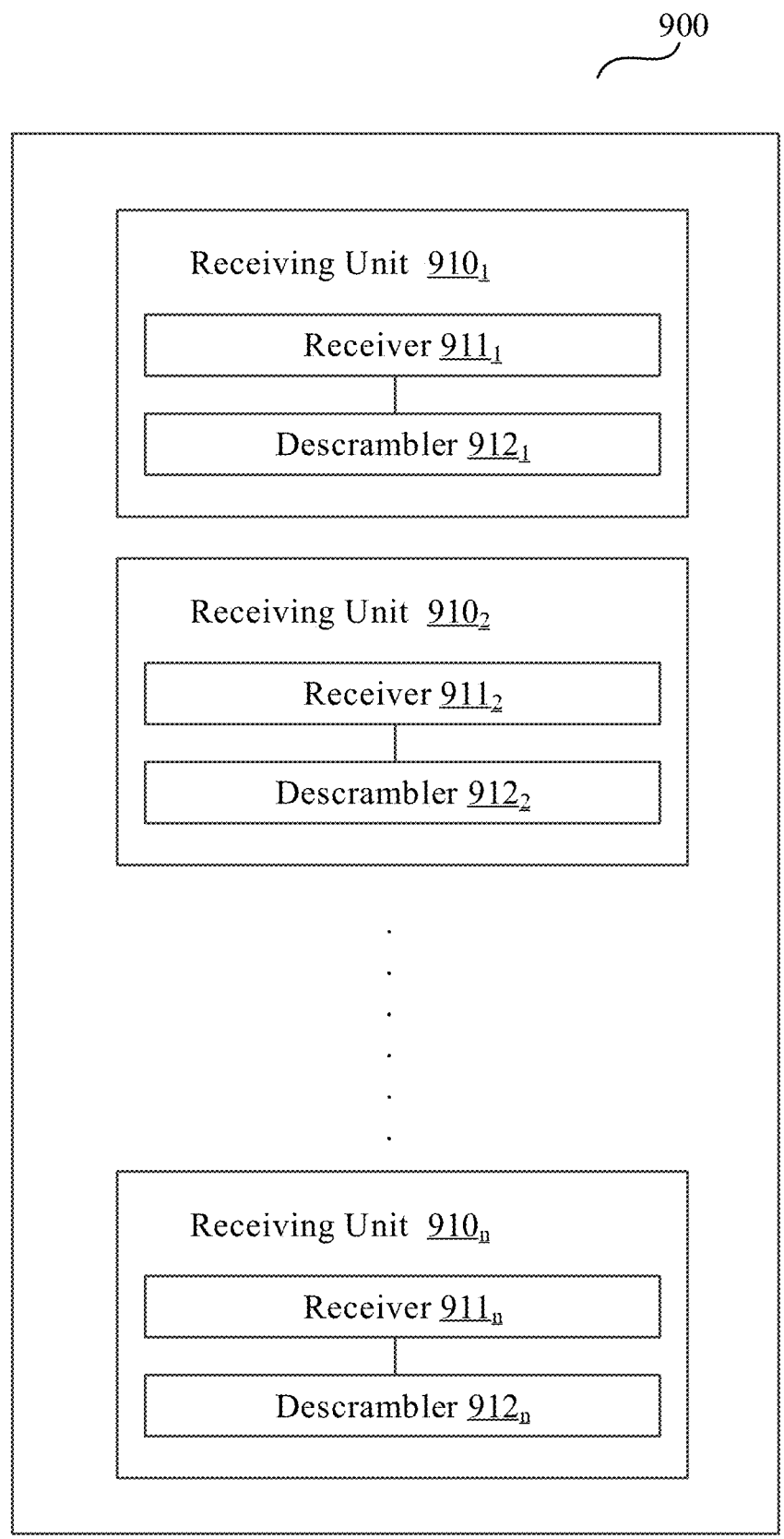
FIG. 9 is a structural schematic view of a receiving unit provided by an embodiment of the present disclosure.

FIG. 9 is a schematic view of the structure 900 of a receiving unit provided by an embodiment of the present disclosure. The receiving unit may be applied in a source driver. The source driver may be implemented as the source driver in FIG. 1, and comprise or use a plurality of receiving units $910_1$, $910_2$, ..., $910_n$. As shown in FIG. 9, the receiving unit $910_1$ may comprise a receiver $911_1$ and a descrambler $912_1$. Similarly, the receiving unit $910_2$ may comprise a receiver $911_2$ and a descrambler $912_2$, and the receiving unit $910_n$ may comprise a receiver $911_n$ and a descrambler $912_n$. The receivers $911_1$, $911_2$, ..., $911_n$ are configured to receive scrambled signals from corresponding transmitting units. A scrambled signal is a signal obtained by scrambling a non-identification signal in the signal to be transmitted via a scrambler in a corresponding transmitting unit. The scrambled signal comprises an identification signal and a scrambled non-identification signal. The descramblers $912_1$, $912_2$, ..., $912_n$ are configured to descramble the scrambled signals to obtain descrambled signals, which correspond to the signals before being scrambled. The descrambler descrambles the received signal in a process inverse to that of the scrambler.

In an embodiment, the scrambler is a first linear feedback shift register, whereas the descrambler is a second linear feedback shift register. The received signal is a signal obtained by scrambling a signal X via the first linear feedback shift register using the following characteristic polynomials: $X^{16}+X^5+X^4+X^3+1$, $X^{24}+X^4+X^3+X+1$ or $X^{32}+X^7+X^5+X^3+X^2+X+1$. Thus, the second linear feedback shift register $912_1$, $912_2$ may also use the following characteristic polynomials corresponding to those of the first linear feedback shift register for descrambling: $X^{16}+X^5+X^4+X^3+1$, $X^{24}+X^4+X^3+X+1$ or $X^{32}+X^7+X^5+X^3+X^2+X+1$.

In some embodiments, the received signal comprises: a plurality of scrambled signal segments and at least one first identification signal between any two adjacent signal segments. The plurality of scrambled signal segments are arranged sequentially in time domain. In an embodiment, the descramblers $912_1$, $912_2$, . . . , $912_n$ may also be configured to identify signal segments in the received signal through the first identification signal, and scramble each of the signal segments individually. In an example, the non-identification signal in each signal segment may be descrambled to obtain the descrambled signal. Accordingly, the signal descrambled by the descramblers $912_1$, $912_2$, . . . , $912_n$ comprises: a plurality of descrambled signal segments and at least one first identification signal. The plurality of descrambled signal segments is arranged sequentially in time domain and there is a first identification signal between any two adjacent signal segments. In some embodiments, the first identification signal is used to instruct the descrambler to perform a reset operation.

In some embodiments, in signals received by any two receiving units, positions of the first identification signals are different in time domain.

In some embodiments, a plurality of receiving units are connected with a plurality of columns of pixel units in a display panel in a one-to-one relationship, and the second linear feedback shift registers in two receiving units connected with any two adjacent columns of pixel units are different, for example, they employ different characteristic polynomials.

In a source driver provided by embodiments of the present invention, signals received by receiving units are scrambled signals obtained by scrambling signals to be transmitted by transmitting units before transmission of the signals, so the signals received by receiving units are substantially different from each other. When a plurality of signals with substantial difference are transmitted simultaneously, the electromagnetic interference between the signals with substantial difference is at a low level, thereby preventing distortion of signals received by the receiving units, and further preventing distortion of a respective image displayed on the display panel.

The embodiments shown in FIGS. 2, 4 and 5 may be implemented fully or partly by software, hardware, firmware or any combination thereof. When it is implemented by software, it may be implemented fully or partly in the form of a computer program product comprising one or more computer instructions. When the computer program instructions are loaded or executed in a computer, the process or function according to the embodiment of the present invention may be generated fully or partly. The computer may be a programmable device, and the computer instruction may be stored in a computer readable storage medium.

The computer readable storage medium may be any available medium that can be accessed by a computer. The available medium may be a magnetic medium, an optical medium or a semiconductor medium, etc.

Various aspects of the present invention may be used individually, in combination or in various arrangements not specifically discussed in the embodiments described above, so its application is not limited to the details and arrangements of components described in the above description or illustrated in the drawings. For example, some aspects described in one embodiment may be combined in any way with some aspects described in other embodiments.

It would be understood by those skilled in the art that all or part of the steps to implement the above-mentioned embodiments can be accomplished by hardware or by a program which instruct related hardware. The program can be stored in a computer-readable storage medium, which may be a read-only memory, a disk, or a CD, etc.

The above embodiments are only preferred embodiments of the present application and not intended to limit the present application. Any modification, equivalent replacement, improvement, etc. made within the spirit and principle of the present application shall be covered within the scope of protection of the present application.

The invention claimed is:

1. A method for transmitting a signal in a display device, the display device comprising a timing controller and a source driver, the method being applied to any one of a plurality of transmitting units of the timing controller, the plurality of transmitting units corresponding to a plurality of receiving units of the source driver in a one-to-one relationship, the method comprising:

obtaining a scrambled signal by scrambling, via a scrambler in a transmitting unit, a non-identification signal in a signal to be transmitted, the scrambled signal comprising an identification signal and a scrambled non-identification signal; and transmitting the scrambled signal to a corresponding receiving unit, wherein a signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$.

2. The method according to claim 1, wherein the signal to be transmitted comprises: a plurality of signal segments arranged sequentially in time domain and at least one first identification signal between any two adjacent signal segments, and the first identification signal is used to instruct the scrambler to perform a reset operation; and the scrambling comprises: scrambling non-identification signals in respective signal segments sequentially by the scrambler to obtain the scrambled signal, and the scrambled signal comprises: a plurality of scrambled signal segments arranged sequentially in time domain and the at least one first identification signal between any two adjacent scrambled signal segments.

3. The method according to claim 2, wherein in signals to be transmitted by any two of the transmitting units, positions of the first identification signals are different in time domain.

4. The method according to claim 1, wherein the plurality of transmitting units are connected with a plurality of columns of pixel units on a display panel in a one-to-one relationship through respective receiving units, and the scrambling comprises: differently scrambling the signals to be transmitted via scramblers in two transmitting units connected with any two adjacent columns of pixel units.

5. The method according to claim 2, wherein the signal to be transmitted comprises: a multi-frame signal spanning images of multiple frames, a single-frame signal included in the multi-frame signal comprises a plurality of row signals, wherein each row signal comprises a start identification signal and an end identification signal as the identification signal, and a control package signal and a video data package signal as the non-identification signal, the start identification signal is used to indicate the start position of said row signal, and the end identification signal is used to indicate the end position of said row signal; and
    at least one of the plurality of end identification signals is used as the first identification signal.

6. A non-transitory computer readable storage medium, wherein the computer readable storage medium stores instructions, which, when executed on a computer, cause the computer to perform the method according to claim 1.

7. A method for transmitting a signal in a display device, the display device comprising a timing controller and a source driver, the method being applied to any one of a plurality of receiving units of the source driver, the plurality of receiving units corresponding to a plurality of transmitting units of the timing controller in a one-to-one relationship, the method comprising:
    receiving a scrambled signal from a transmitting unit, the scrambled signal being obtained by scrambling, via a scrambler in the transmitting unit, a non-identification signal in the signal to be transmitted, the scrambled signal comprising an identification signal and a scrambled non-identification signal; and
    descrambling the scrambled signal by a descrambler in a receiving unit to obtain a descrambled signal;
    wherein a signal obtained by scrambling a signal X via the scrambler is $X^{16}+X^5+X^4+X^3+1$, $X^{24}+X^4+X^3+X+1$ or $X^{32}+X^7+X^5+X^3+X^2+X+1$, and the descrambling of a signal by the descrambler is an inverse process of the scrambling of the signal by the scrambler.

8. The method according to claim 7, wherein the received signal comprises: a plurality of scrambled signal segments arranged sequentially in time domain and at least one first identification signal between any two adjacent signal segments, and the first identification signal is used to instruct the descrambler to perform a reset operation; and
    the descrambling comprises: descrambling non-identification signals in respective scrambled signal segments sequentially by the descrambler to obtain descrambled signal segments, and the descrambled signal comprises: a plurality of descrambled signal segments arranged sequentially in time domain and at least one first identification signal between any two adjacent descrambled signal segments.

9. The method according to claim 8, wherein in signals received by any two receiving units, positions of the first identification signals are different in time domain.

10. The method according to claim 7, wherein the plurality of receiving units are connected with a plurality of columns of pixel units in a display panel of the display device in a one-to-one relationship, and the descrambling comprises: differently descrambling received signals by descramblers in two receiving units connected with any two adjacent columns of pixel units.

11. The method according to claim 8, wherein a received signal comprises: a multi-frame signal spanning images of multiple frames, and a single-frame signal included in the multi-frame signal comprises a plurality of row signals, wherein each row signal comprises a start identification signal and an end identification signal as the identification signal, and a control package signal and a video data package signal as the non-identification signal, the start identification signal is used to indicate the start position of the row signal, and the end identification signal is used to indicate the end position of the row signal; and
    at least one of the plurality of end identification signals is used as the first identification signal.

12. A non-transitory computer readable storage medium, wherein the computer readable storage medium stores instructions, which, when executed on a computer, cause the computer to perform the method according to claim 7.

13. A transmitting unit, being any one of a plurality of transmitting units of a timing controller of a display device, the plurality of transmitting units corresponding to a plurality of receiving units of a source driver of the display device in a one-to-one relationship, and the transmitting unit comprising:
    a scrambler configured to scramble a non-identification signal in a signal to be transmitted in order to obtain a scrambled signal, the scrambled signal comprising an identification signal and a scrambled non-identification signal; and
    a transmitter configured to transmit the scrambled signal to a corresponding receiving unit;
    wherein the scrambler is configured to scramble a signal X to obtain a signal: $X^{16}+X^5+X^4+X^3+1$, $X^{24}+X^4+X^3+X+1$ or $X^{32}+X^7+X^5+X^3+X^2+X+1$.

14. The transmitting unit according to claim 13, wherein the signal to be transmitted comprises: a plurality of signal segments arranged sequentially in time domain and at least one first identification signal between any two adjacent signal segments, and the scrambler is configured to perform a reset operation when the first identification signal is detected, and
    the scrambler is further configured to: scramble non-identification signals in respective signal segments sequentially to obtain the scrambled signal, and the scrambled signal comprises: a plurality of scrambled signal segments arranged sequentially in time domain and the at least one first identification signal between any two adjacent scrambled signal segments.

15. The transmitting unit according to claim 14, wherein in signals to be transmitted by any two of the transmitting units, positions of the first identification signals are different in time domain.

16. The transmitting unit according to claim 13, wherein the plurality of transmitting units are connected with a plurality of columns of pixel units in a display panel of the display device in a one-to-one relationship by corresponding receiving units; and scramblers in two transmitting units connected with any two adjacent columns of pixel units differently scramble the signal to be transmitted.

17. A receiving unit, being any one of a plurality of receiving units of a source driver of a display device, the receiving unit comprising:
    a receiver used to receive a scrambled signal from a transmitting unit according to claim 13 to which the receiving unit corresponds; and
    a descrambler used to descramble the scrambled signal to obtain a descrambled signal;
    wherein the descrambling of a signal by the descrambler is an inverse process of the scrambling of the signal by the scrambler.

18. The receiving unit according to claim 17, wherein a received signal comprises: a plurality of scrambled signal segments arranged sequentially in time domain and at least one first identification signal between any two adjacent signal segments, and the descrambler is configured to perform a reset operation when the first identification signal is detected;

the descrambler is further configured to: descramble non-identification signals in respective scrambled signal segments sequentially to obtain descrambled signal segments, wherein the descrambled signal comprises: a plurality of descrambled signal segments arranged sequentially in time domain and the at least one first identification signal between any two adjacent descrambled signal segments.

19. The receiving unit according to claim 17, wherein the plurality of receiving units are connected with a plurality of columns of pixel units of a display panel in a one-to-one relationship, and descramblers in two receiving units connected with any two adjacent columns of pixel units differently descramble the received signals.

20. A display device, comprising a timing controller and a source driver circuit, wherein the timing controller comprises a plurality of transmitting units, the source driver circuit comprises a plurality of receiving units, and the plurality of transmitting units correspond to the plurality of receiving units in a one-to-one relationship; and each of the plurality of transmitting units comprising:

a scrambler configured to scramble a non-identification signal in a signal to be transmitted in order to obtain a scrambled signal, the scrambled signal comprising an identification signal and a scrambled non-identification signal; and a transmitter configured to transmit the scrambled signal to a corresponding receiving unit;

wherein the scrambler is configured to scramble a signal X to obtain a signal: $X^{16}+X^5+X^4+X^3+1$, $X^{24}+X^4+X^3+X+1$ or $X^{32}+X^7+X^5+X^3+X^2+X+1$, and each of the plurality of receiving units is the receiving unit according to claim 17.

* * * * *